Aug. 10, 1965      T. R. SANTELLI      3,199,701
POLYETHYLENE CONTAINER INCLUDING IN SITU
POLYMERIZED STYRENE IMPREGNANT
Filed May 19, 1960
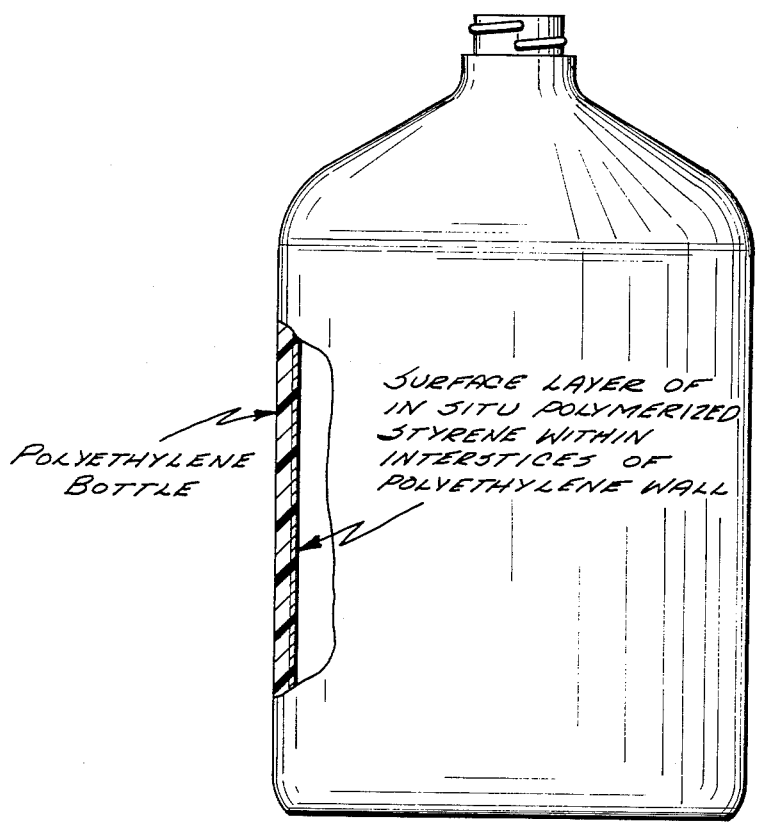
INVENTOR.
THOMAS R. SANTELLI
BY W. A. Schaich &
Charles S. Lynch
ATTORNEYS

United States Patent Office 3,199,701
Patented Aug. 10, 1965

3,199,701
POLYETHYLENE CONTAINER INCLUDING IN SITU POLYMERIZED STYRENE IMPREGNANT
Thomas R. Santelli, Toledo, Ohio, assignor to Owens-Illinois Glass Company, a corporation of Ohio
Filed May 19, 1960, Ser. No. 30,087
1 Claim. (Cl. 215—1)

This invention relates to plastic articles of low permeability and to a method of producing same.

One of the limiting factors in the use of plastics for packaging, and particularly as containers, is the ready permeability of plastics to certain liquid and gaseous chemicals. For example, it is well known that one of the commonly used plastics, polyethylene, is permeable to a certain aromatic, aliphatic and alicyclic non-polar type compounds such as xylene, carbon tetrachloride, petroleum ether, ethanol and cymene.

Attempts have been made to prevent permeation by applying a coating of another type of plastic or by laminating another plastic to the plastic base, but such attempts have proved costly and not completely satisfactory.

It is an object of this invention to provide a method of reducing the permeability of plastic and particularly polyethylene to certain liquid or gaseous chemicals.

In the drawing is shown a polyethylene bottle in partial cross section wherein, according to the present invention, there is depicted an interior surface layer of in situ polymerized styrene within the interstices of the polyethylene wall.

It is a further object of the invention to provide plastic articles which are less permeable than the basic plastic material of which the article is made.

Basically, the method comprises diffusing a polymerizable monomer into a surface of the plastic article, and thereafter polymerizing the monomer to cause the resultant polymer to fill the interstices of the plastic article.

The monomer used depends upon the plastic of which the article is made and the chemicals to which the plastic is permeable.

Generally, the monomers used are of the non-polar type if the plastic is of the non-polar type such as in the case of polyethylene.

By way of example and not limitation, monomers which can be used with solid polyethylene are styrene, alpha-methylstyrene, divinyl benzene, methyl methacrylate and diallylphthalate.

Other applicable monomers include acrolein, acrylic acid, butadiene, butenes, propylene, α-nitro methacrylate, para-amino styrene, vinyl triethoxysilane and allyl triethoxysilane.

An example of the method of reducing the permeability of the plastic container is as follows: a 12 ounce polyethylene container was filled with a xylene solution containing 5% by weight of a styrene monomer. A red dye was added to the solution and a small amount of benzoyl peroxide was added. The container was stored at 130° F. for approximately 24 hours. The container was then drained. The walls of the container had become red proving that permeation had taken place. The container was then placed in an oven at 110° C. to effect polymerization of the styrene polymer. When the styrene treated polyethylene container was submerged in ethyl alcohol the red dye was not extracted, showing that the styrene had polymerized. When a similar container in which the red dye had been allowed to permeate the container wall by the use of the xylene solution without styrene was submerged in ethyl alcohol the red dye was leached out and that permeability to ethyl alcohol was greatly reduced in the treated container.

The resultant container has no visible coating thereon in addition to being less permeable to the gaseous and liquid chemicals.

It can thus be seen that by the above method it is possible to reduce the permeability of a plastic article to certain gaseous or liquid chemicals by causing a monomer to diffuse into or permeate the interstices of the article and then polymerizing the monomer in situ in the interstices of the article, the resultant polymer filling the interstices.

Thus, according to the invention, there is provided a method of reducing the permeability of a solid organic plastic material to liquid and gaseous chemicals which comprises impregnating a surface of said article with a polymerizable monomer dissolved in a solvent, polymerizing said monomer in situ in the interstices of said plastic article, and thereby reducing the permeability of said article.

In one embodiment there is provided a method of reducing the permeability of a plastic container made of polyethylene which comprises introducing a solution of a polymerizable monomer contaning a polymerizable vinyl group in said container, permitting said container containing said solution to stand at an elevated temperature for a predetermined period of time to cause some of said solution to penetrate the interstices of said container, removing the excess monomer by pouring out the liquid from said container, and heating said container to polymerize the monomer in the interstices, and thereby reducing the permeability of the container.

An important feature of the method of the invention is that the monomer is dissolved in a solvent therefor before contacting the polyethylene or other plastic article. The solution is usually less than 20 weight percent monomer, and is at least 1 weight percent monomer. Preferably, the solution contains no more than 15 weight percent monomer. Unless a dilute solution is employed, the desired permeation is not obtained, and a visible skin or film of polymerized monomer is obtained on the plastic surface.

It is, of course, apparent that this method can be used for reducing the permeability of plastics other than polyethylene such as polypropylene, polyvinyl chloride, polybutadiene,1,3-butadiene-styrene copolymers and the like.

As will be evident to those skilled in the art, various modifications of this invention can be made or followed in the light of the foregoing disclosure and discussion without departing from the spirit and scope of the disclosure or from the scope of the claim.

I claim:

A container of polyethylene plastic which is normally permeable to liquid and gaseous chemicals, an in situ-formed polystyrene within the interstices of an entire surface of said container, said container having no visible external coating of said in situ-formed polystyrene on said surface.

References Cited by the Examiner

UNITED STATES PATENTS

| | | |
|---|---|---|
| 2,450,503 | 10/48 | Drummond. |
| 2,828,237 | 3/58 | Rosser _____ 117—138.8 |
| 2,830,721 | 4/58 | Pinsky et al. _____ 215—1 |
| 2,860,801 | 11/58 | Nielsen _____ 117—138.8 XR |
| 2,892,733 | 6/59 | Gardner et al _____ 117—47 |
| 2,956,899 | 10/60 | Cline _____ 117—47 |
| 2,985,542 | 5/61 | Pinsky et al. _____ 117—138.8 |
| 2,999,764 | 9/61 | Rhoads _____ 117—47 |
| 2,999,772 | 9/61 | Burk et al. _____ 117—138.8 |
| 3,022,191 | 2/62 | Cuppuccio et al. _ 117—138.8 XR |
| 3,067,056 | 12/62 | Remer _____ 117—138.8 |

RICHARD D. NEVIUS, *Primary Examiner.*